July 10, 1951 J. M. HILDYARD 2,559,622

ELECTRICAL APPARATUS

Filed April 3, 1945 4 Sheets-Sheet 1

JOSEPH M. HILDYARD
INVENTOR
William D. Hall
ATTORNEY

JOSEPH M. HILDYARD
INVENTOR
William D. Hall.
ATTORNEY

July 10, 1951 J. M. HILDYARD 2,559,622

ELECTRICAL APPARATUS

Filed April 3, 1945 4 Sheets-Sheet 3

JOSEPH M. HILDYARD
INVENTOR
William D. Hall
ATTORNEY

JOSEPH M. HILDYARD
INVENTOR
William D. Hall
ATTORNEY

Patented July 10, 1951

2,559,622

UNITED STATES PATENT OFFICE 2,559,622

ELECTRICAL APPARATUS

Joseph M. Hildyard, United States Army,
Arlington County, Va.

Application April 3, 1945, Serial No. 586,428

4 Claims. (Cl. 178—22)

(Granted under the act of March 3, 1883, as amended April 30, 1928; 370 O. G. 757)

The invention described herein may be manufactured and used by or for the Government for governmental purposes, without the payment to me of any royalty thereon.

This invention is in electrical apparatus and particularly is a novel electrical control for various types of electrical or mechanical devices.

One object of the present invention is to provide novel electrical means for controlling translating devices.

Another object is to provide in an electrical apparatus adapted to control a plurality of translating devices novel means dependent upon signal frequencies for selectively energizing said translating devices.

A further object is to provide in an apparatus of the nature mentioned including translating devices adapted to be energized selectively by the closing of switching devices means for producing composite signals for selecting and closing the switching devices and for energizing the translating devices.

An additional object is to provide a novel combination of closing and locking and releasing circuits for a plurality of translating devices.

A still further object is to provide a novel means for combining telegraph signals.

Other objects will be apparent from a reading of the following specification and claims.

Figure 3:
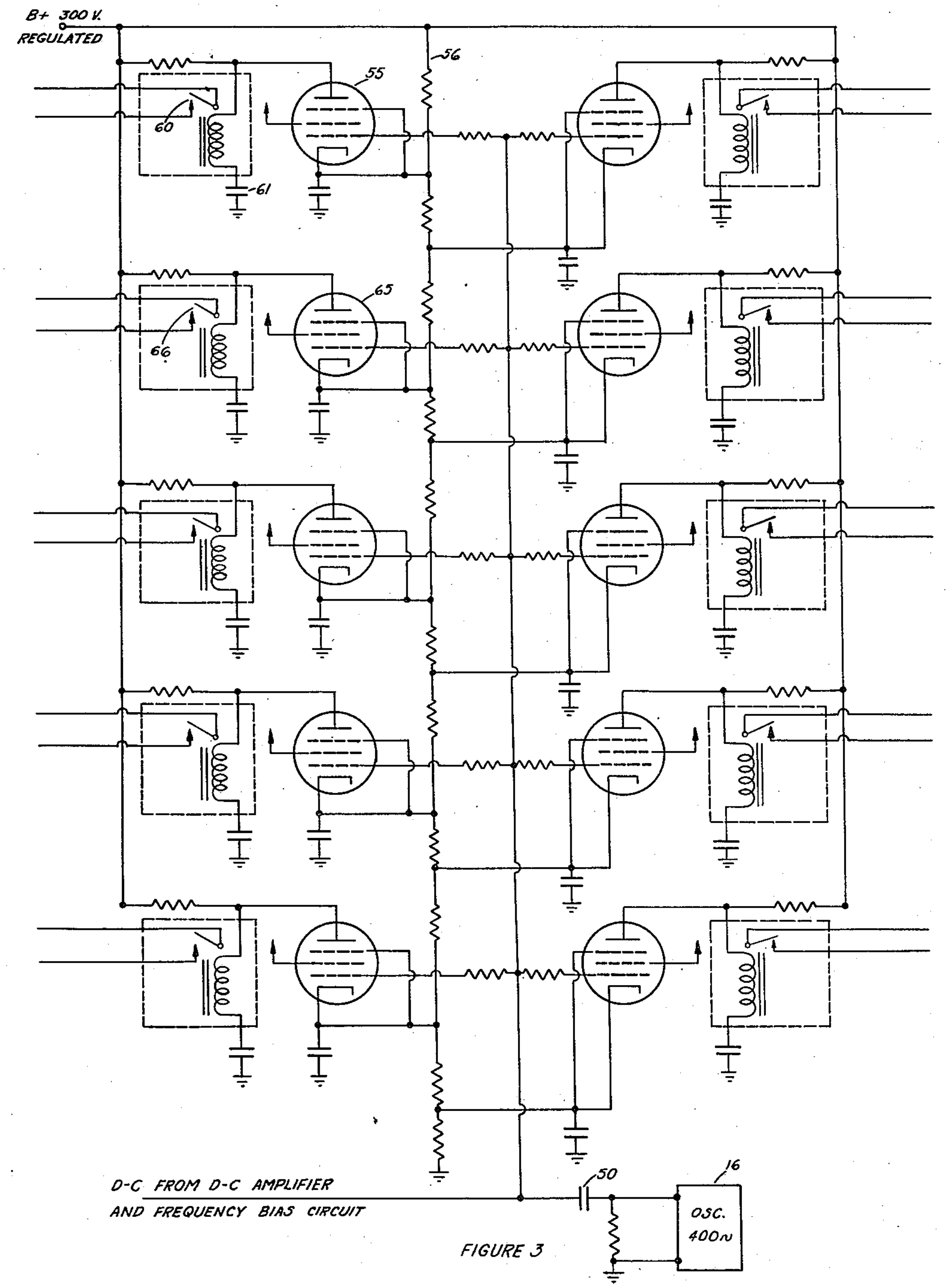
Figure 3 is a schematic diagram of a novel relay control circuit.

Generally considered, the invention comprises or utilizes a continuous wave transmitter, 10, a modulator, 11, a receiver and detector, 12, which will isolate the modulating signal, a frequency bias circuit, 13, to convert the modulation frequency to a direct current voltage, a direct current amplifier, 14, a relay control circuit, Figure 3, actuated by the output of the amplifier, 14, and an oscillator, 16 (Figure 3), for supplying a low frequency alternating current signal to the tubes of the control circuit.

This last mentioned signal is amplified and utilized for the actual control of a group of relays or other translating devices. While it will be assumed that the transmitted signal is amplitude modulated, frequency modulated signals may be transmitted instead; the operation of the invention in such case will be obvious in view of the description to follow.

Modulator 11 provides transmitter 10 with frequencies varying according to any predetermined plan, as, for example, in increments of three hundred cycles from, for example, two thousand to five thousand cycles per second. The frequency of the modulator is varied by inserting proper condensers, 25, across the tank of the frequency generator as by closing one or more of the switches, 26. The magnitudes of the steps and their number will depend upon the requirements of the apparatus.

Receiver 12 is conventional and serves to detect the modulation frequency of the received signal and to apply it to the grids of the Thyratrons, 27 and 28, of frequency bias circuit 13, to trigger these tubes. As these tubes fire, portions of the charge and discharge currents of condensers 30 and 31 in their cathode circuits are drawn through rectifier 32 to produce a direct current voltage across the resistor-capacitor network, 34—35, and the low-pass filter, 41—42, the time constant of which is such that the output of bias circuit 13 will not vary more than one per cent between pulses at the lowest modulation frequency of the transmitter.

The charge and discharge time constants of the resistance-capacity circuits, 30—32 and 31—33, are much smaller than the period of the highest triggering frequency. As a result, the voltage across the circuit, 34—35, is practically linear with frequency and independent of the amplitude of the pulses of the triggering signal. The operation of the apparatus is thus not adversely affected by the distance between transmitter and receiver and signal deterioration normally occurring in long distance communications.

The direct current output of filter 41—42 is applied to the grid of amplifier tube 40. An increase in the modulating frequency reaching bias circuit 13 causes a decrease in the plate voltage of tube 40. The output of amplifier 40 is applied to the grids of the several relay control tubes in the circuit illustrated in Figure 3.

A low frequency alternating current voltage, four hundred cycles for example, is generated at 16 (Figure 3) and likewise applied to the grids of the tubes of the relay control circuit. Generator 16 is isolated from direct current amplifier 14 by condenser 50. The amplitude of the audio wave should be small enough so that, while it is being amplified by one tube of the relay control circuit, it will not extend into the amplification region of either of the adjacent tubes. The necessity for the use of a low-amplitude signal at this point will be more apparent from the following description.

The relay control circuit (Figure 3) comprises, for example, ten identical components, similarly connected, except that they are tied in at different points to a bleeder, 56, so that the total resistance between any cathode and ground is different from the resistance from any other cathode. The resistances in the bleeder circuit are so selected that the voltage increments between successive cathodes are slightly greater than the cut-off voltages of the tubes.

The operation of the invention is based upon the fact that, if the control grid of a tube, as 55, is below cut-off or is conducting through a high impedance, the tube will not amplify an alternating current voltage applied to the impedance. If the grid is biased between cut-off and zero voltage, grid to cathode, the tube will amplify such an alternating current voltage.

Under conditions of no receiver signal, the grids of all of the control tubes are conducting under the influence of the output of the direct current amplifier. If now the correct modulating frequency is fed into frequency biasing circuit 13, the plate voltage of amplifier 14 will drop to a value which places the grid of some tube, 55 for example, between cut-off and zero. Tube 55 will amplify the applied alternating current signal and an alternating current will be drawn through the tube. Grids of all the other tubes continue to conduct as before. Relay 60, in the plate circuit of tube 55, which has low resistance to alternating current but infinite resistance to direct current by virtue of condenser 61 between it and ground, is actuated while the other relays remain unoperated. A signal of different frequency, received and applied to the frequency biasing circuit, as just described, will cause tube 55 to cut-off and some other tube, as 65, to conduct and thus to actuate its relay 66.

By properly selecting the modulating frequencies at the transmitter, the relays of Figure 3 can, of course, be caused to operate in any desired order. If the frequency of the transmitted signal is continuously varied from its minimum value to maximum repeatedly, the relays will be caused to operate consecutively, thus to produce a relay ring circuit; and a similar effect may be obtained by mixing with the output of oscillator 16 a stairwave the values of the steps of which vary in accordance with the characteristics of the tubes of the control circuit.

Figure 4:
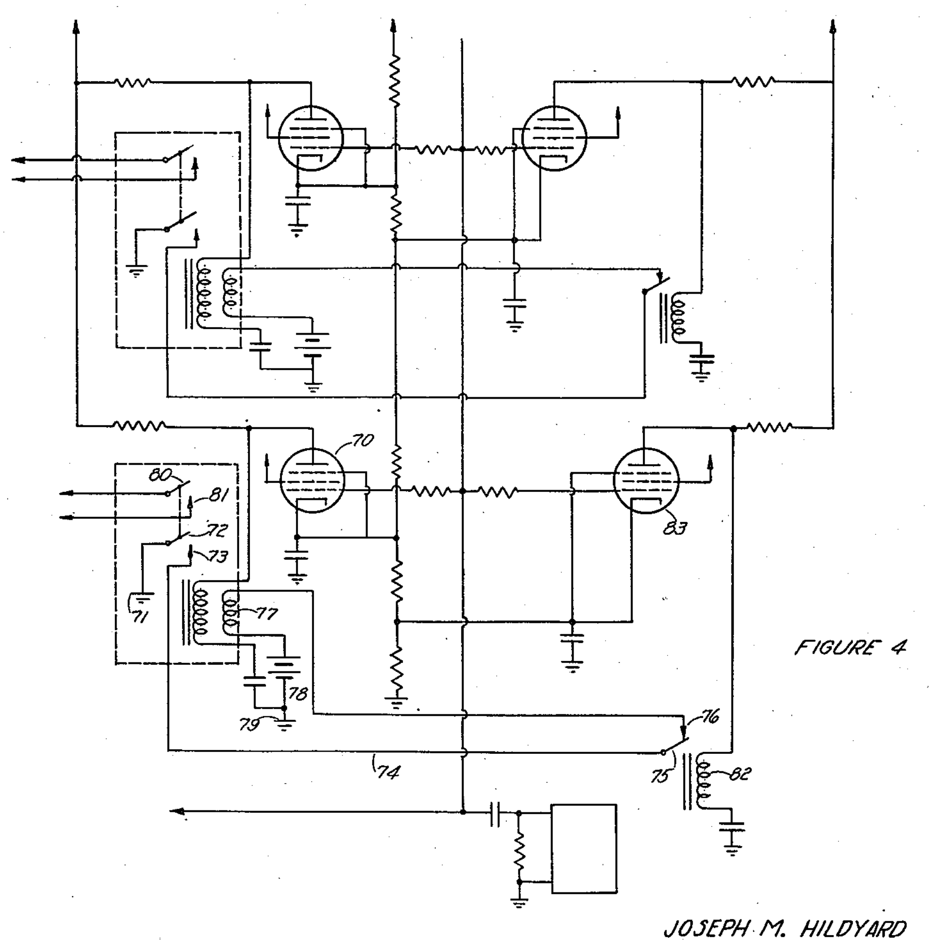
Figure 4 illustrates a modified form of relay control.

A somewhat different form of relay control is illustrated in Figure 4 wherein only four control tubes and portions of the relay circuits are shown. It will be understood, however, that preferably the principles of the apparatus of Figure 4 will be applied to a circuit such as shown in Figure 3 with each control governing the operation of a relay.

According to Figure 4, the conduction in control tube 70 serves to energize a relay closing circuit just as in Figure 3. An additional set of contacts is provided, however, and these complete a locking circuit for the relay from ground at 71 through contacts 72 and 73, line 74, normally closed contacts 75 and 76, winding 77, battery 78, and ground at 79. This locking circuit, of course, holds relay contacts 72 and 73 as well as contacts 80 and 81 closed after conduction ceases in tube

70. The relay will be held operated until winding 82 is energized through control tube 83.

Thus, it is possible to set up a plurality of conditions one at a time in the various relays associated with the control tubes, to hold such conditions as long as desired, and to return the relays to a normal unoperated condition in any order through proper selection of control frequencies.

Figure 5:
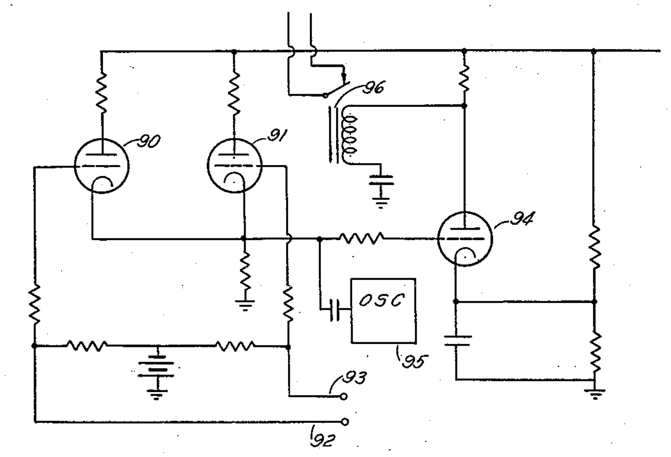
Figure 5 shows a novel combining circuit.

With reference to Figure 5, the principles of the invention may be utilized to combine Teletype or other telegraph signals in order to encipher the same. Such combining is generally accomplished according to the so-called Vernam rule (see patent to Vernam, No. 1,310,719), as follows:

$$\begin{array}{cccc} + & - & - & + \\ \pm & = & \pm & = \\ + & + & - & - \end{array} \qquad \text{or} \qquad \begin{array}{cccc} + & - & - & + \\ \pm & = & \pm & = \\ - & - & + & + \end{array}$$

where a + represents a marking or current impulse and a —, a spacing or no-current impulse, a keying signal or sequence of impulses being added, element by element, to an intelligence signal to obtain an enciphered signal for transmission. Such an enciphered signal may be deciphered by re-adding the keying signal just as above described.

Figure 1:
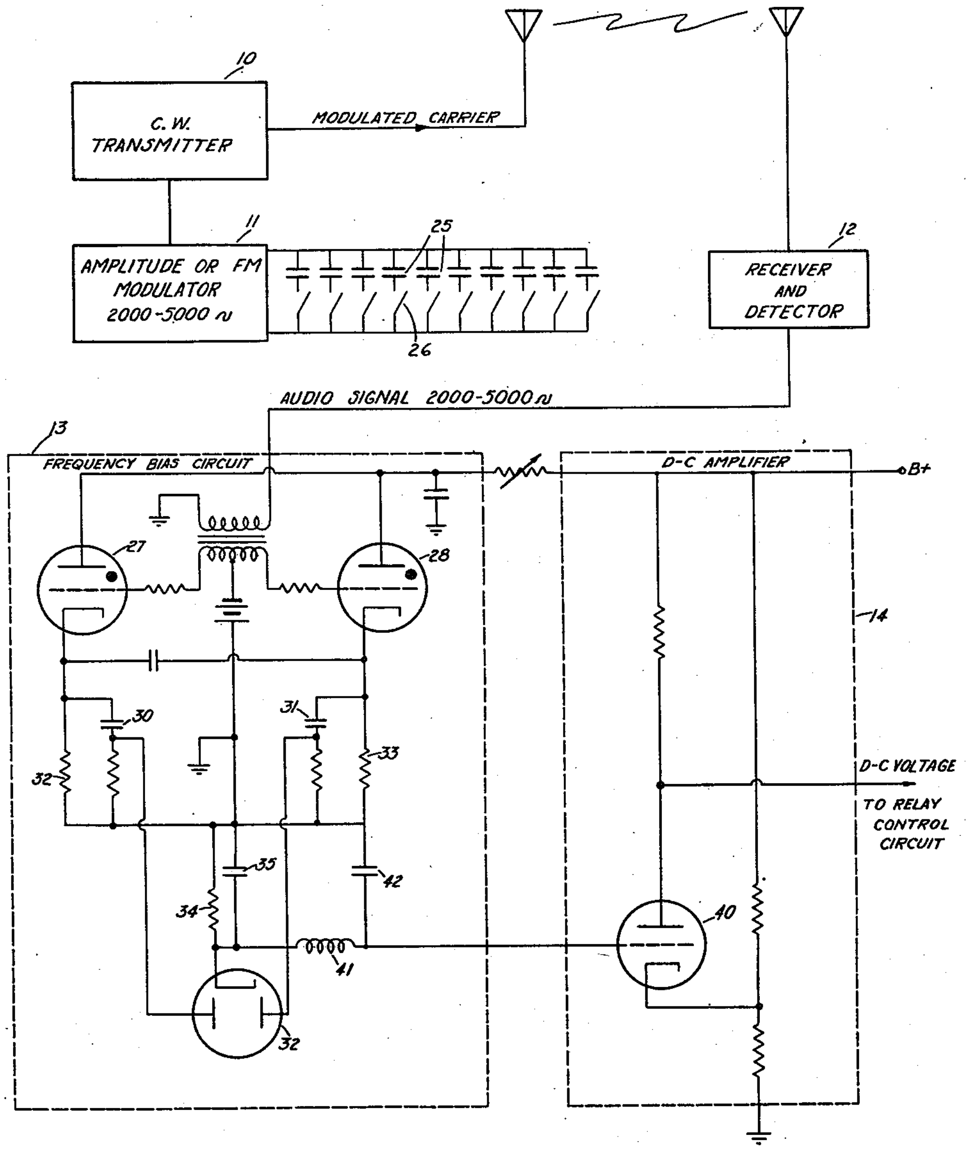
Figure 1 is a diagram partly in block form of a transmitting apparatus and a portion of a receiving apparatus.
Figure 2:
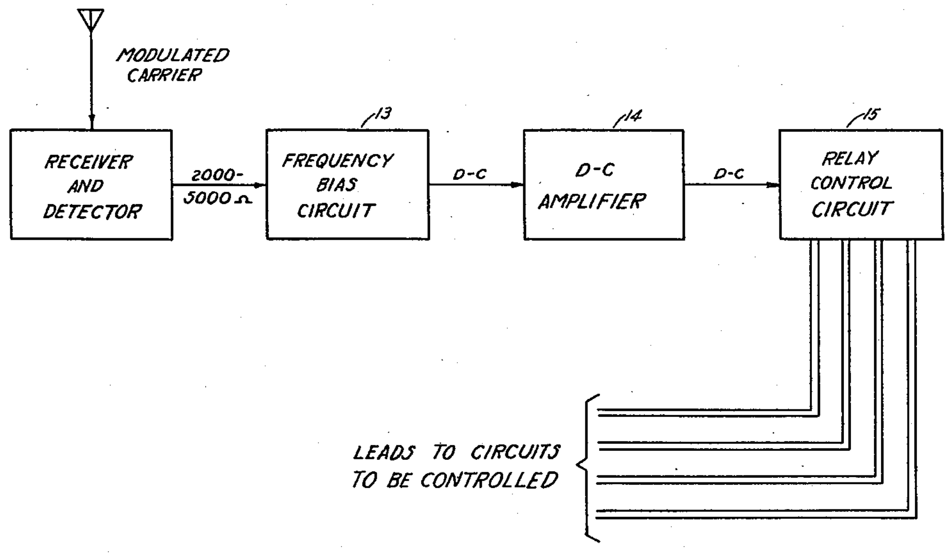
Figure 2 is a further diagram of the receiving apparatus.

When this invention is employed, signals of only two levels are transmitted, one level representing a marking interval, and the other representing a spacing interval; the signals are received and otherwise treated as in Figures 1 and 2, and the output of direct current amplifier 14 applied to lead 92 of Figure 5 while a keying signal identical with that used to encipher the signal is synchronously applied to lead 93 of Figure 5. Tubes 90 and 91 then serve to add the synchronized signals, the resulting voltage being applied to tube 94.

Normally, tubes 90 and 91 are not conducting, their grids being maintained at a strong negative potential with respect to their cathodes. Let us assume, however, that a marking signal consists of or may be caused to produce a positive voltage impulse sufficient to produce conduction in either tube. Should a marking impulse be received over either line 92 (that carrying the enciphered signal) or line 93 (that carrying the keying signal), thereby to produce conduction in one of the tubes, the grid of control tube 94 is driven positive to a point between zero (grid-to-cathode) and cut-off, and the output of the low-frequency oscillator, 95, is drawn through the tube to operate and open relay 96 so that a spacing signal is transmitted. Should both of tubes 90 and 91 be conducting, the grid of tube 94 is carried positive with respect to the cathode, the alternating-current relay-controlling signal is not amplified, and relay 96 remains closed, whereby a marking signal is transmitted. Thus, whenever a marking and a spacing impulse are delivered simultaneously to the combining circuit, a spacing signal results; whenever two marking or spacing impulses are received, a marking impulse results. Obviously, by giving relay 96 a normal open condition, the addition of like signals will result in a spacing impulse and the addition of unlike signals, in a marking impulse.

The foregoing description is in specific terms but should not be construed to limit the invention otherwise than in the light of the appended claims.

I claim:

1. In an apparatus of the nature described, means for receiving signals of different frequencies, a plurality of translating devices, a control tube for each translating device, means for converting the signals of different frequencies to direct current signals of different values each value being sufficient to bias a single control tube for conduction, means for mixing said last mentioned signals with other signals for energizing said translating devices, and means for applying the combined signals to the control tubes in parallel.

2. In a communication system, the combination of means for producing a carrier wave, means for generating a plurality of modulating frequencies and for selectively modulating said carrier wave thereby, means for receiving the signal and for isolating the modulating frequencies thereof, means for converting each modulating signal into a direct current signal related in value to the frequency of the modulating signal, a plurality of translating devices, a source of current for actuating said translating devices, and a plurality of switching tubes each responsive to one only of said direct current signals for transmitting said current from said source to said translating devices.

3. In a communication system a combination means for receiving a modulated carrier wave, means for converting each modulating signal into a direct current signal related in value to the frequency of the modulating signal, a plurality of translating devices, a source of current for actuating said translating devices, and a plurality of switching tubes each responsive to one only of said direct current signals for transmitting said current from said source to said translating devices.

4. In a communcation system a combination of means for producing a selectively modulated carrier wave, means for receiving the signal and for isolating the modulating frequencies thereof, means for converting each modulating signal into a direct current signal related in value to the frequency of the modulating signal, a plurality of translating devices, a source of current for actuating said translating devices, and a plurality of switching tubes each responsive to one only of said direct current signals for transmitting said current from said source to said translating devices.

JOSEPH M. HILDYARD.

REFERENCES CITED

The following references are of record in the file of this patent:

UNITED STATES PATENTS

| Number | Name | Date |
|---|---|---|
| 1,801,657 | Buyko | Apr. 21, 1931 |
| 1,952,369 | Gardner | Mar. 27, 1934 |
| 2,008,563 | Sarbey | July 16, 1935 |
| 2,095,124 | Cockrell | Oct. 5, 1937 |
| 2,282,046 | Goldsmith | May 5, 1942 |
| 2,330,357 | Mote | Sept. 28, 1943 |
| 2,413,440 | Farrington | Dec. 31, 1946 |